Sept. 14, 1965  C. W. McCUTCHEN ETAL  3,206,660
ELECTRICAL CAPACITORS WITH LOW INDUCTANCE
Filed Oct. 13, 1961

Inventors
Charles Walter McCutchen
Ian David Howard
By Stevens, Davis, Miller & Mosher
Attorneys

3,206,660
ELECTRICAL CAPACITORS WITH LOW INDUCTANCE

Charles Walter McCutchen, % Cavendish Laboratory, Cambridge, England, and Ian David Howard, Tallahassee, Fla.; said Howard assignor to said McCutchen
Filed Oct. 13, 1961, Ser. No. 144,869
Claims priority, application Great Britain, Oct. 14, 1960, 35,392/60
3 Claims. (Cl. 317—260)

This invention concerns improvements in or relating to electrical capacitors.

Any practical electrical capacitor, instead of providing a pure capacitance, is a complex circuit involving distributed capacitance, inductance and resistance. When such a capacitor is used in moderate frequency circuits, it can generally be regarded simply as a capacitance in series with a small inductance. Such small inductance can usually be ignored when the capacitor is used for transmitting A.C. voltage signals, since its reactance is negligible compared with the high impedance at which such signals are generally transmitted, and its effects can be minimised or compensated in R.C. and L.C. circuits by suitable choice of the circuit components. However, in circuits for filtration, decoupling and current by-passing, especially in wide-band apparatus, the existence of this small impedance is a disadvantage difficult to overcome.

Various designs of capacitor construction have been produced in an endeavour to reduce the value of this small inductance. Thus, in the case of tubular paper or electrolytic capacitors having axial end leads, since most of the inductance lies in the flux linking the circuit completed by these leads, the actual capacitative element of such capacitors (hereinafter called the capacitor element) is generally mounted in a close fitting metal can so as to make the wire leads as short as possible. At the same time, such mounting arrangement reduces the inductance of the capacitor element by reducing the space available for the magnetic field. For a typical metallised capacitor, viz. the 1 µf. 250 v. Hunts capacitor type W48, A309, the mounting of the capacitor element in this way reduces the inductance by a factor of about 8, e.g. from a value of $50 \times 10^{-9}$ H to about $6 \times 10^{-9}$ H. This is, however, still too large for many uses.

It is an object of this invention to provide a capacitor construction in which the impedance is reduced as compared with constructions known hitherto.

This object is achieved according to this invention, by providing the capacitor element with leads of sheet form extending outwardly from the element so as to be closely adjacent to, but electrically insulated from one another.

Advantageously, the leads are arranged so that the portions thereof extending outwardly from the element form a low impedance transmission line and any portions of the leads connecting this line to the foils or electrodes of the element lie as close to the element as possible.

This invention is described with reference to the accompanying drawings, in which.

Figure 1:
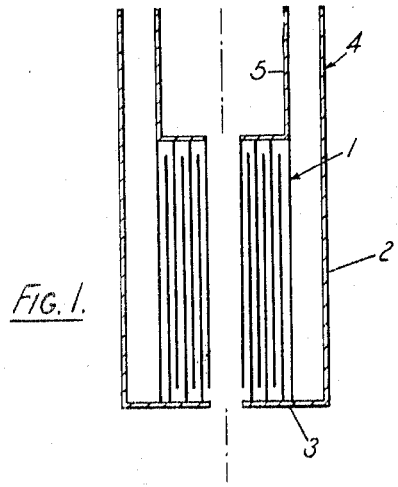
FIGURE 1 is a schematic cross-sectional view of one embodiment of capacitor according to the invention.

Referring to FIGURE 1, the capacitor there illustrated comprises a capacitor element 1 mounted in a close fitting can 2, as in the case of conventional capacitors, but without the element being given the customary wax or resin casing, the can being connected to, or forming, the terminal at one end 3 of the capacitor element 1 and being extended beyond such element at the other end to form one lead 4 of cylindrical sheet form, the other lead 5, also of cylindrical sheet form, extending from such other end coaxially within the lead 4, the two leads being closely spaced, but electrically insulated from, one another. In FIGURE 1, the spacing of the leads is greatly exaggerated for clarity. In such a construction, the element is a closer fit within the can than is the case in conventional capacitors and the two leads form a short length of coaxial low impedance transmission line.

Instead of the sheet-form leads being coaxial cylinders, they may be formed as flat metal foil tapes which are wrapped around the capacitor element so as to form a flat transmission line, the tape leads being insulated from one another advantageously by a tape of electrically insulating material sandwiched between the metal foil tapes. Conveniently, the insulating tape is a tape having adhesive on each side and, also conveniently, the metal foil is copper foil.

Figure 2:
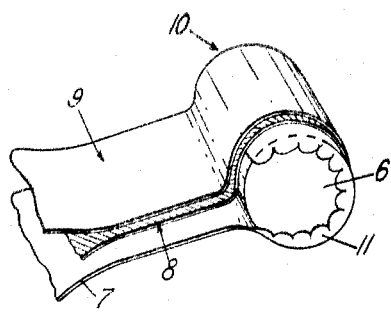
FIGURE 2 is a perspective view of a second embodiment of capacitor according to the invention.
Figure 3:
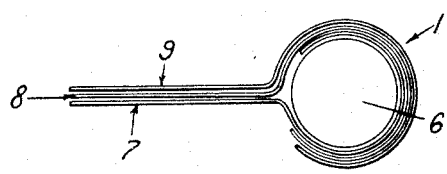
FIGURE 3 is a side elevational view of the embodiment of FIGURE 2, with the leads and interposed adhesive tape shown in cross-section.

Such a construction is illustrated in FIGURES 2 and 3.

The capacitor illustrated in FIGURES 2 and 3 comprises a paper or electrolytic capacitor element 1 of cylindrical form having a metallised plate terminal 6 at each of the ends 10 and 11, an inner tape lead 7 of copper foil which is wound round the element for a little less than one complete turn and then extends substantially radially outwardly from the element, an electrically insulating tape 8, which is adhesive on both sides and is superimposed on the inner tape lead 7 and wound around the capacitor element 1 over the inner tape lead 7 in a direction opposite to the direction of winding of the latter, and an outer tape lead 9 which is superimposed on the insulating tape 8 and wound around the element in the same direction as the latter. The edge of the inner tape lead 7 at the end 10 is spaced from the adjacent plate terminal 6 of the element, whilst the edge at the end 11 is, for the length of the tape which forms the winding around the element, extended beyond the end of the element and is crimped over such end and secured, e.g. by soldering, to the plate terminal 6 as best seen in FIGURE 2. The outer tape lead 9 is similarly secured to the plate terminal 6 at the opposite end 10 of the element by crimping over and securing to the plate terminal.

Desirably, the element, together with the portions of the tapes wound therearound are potted, i.e., embedded in a moulded resin casing.

In the above-mentioned construction, the portions of the tape leads 7 and 9 which extend radially outwardly from the capacitor element are superimposed on one another with the insulating tape 8 sandwiched between them and form a flat, low impedance, transmission line. Such a line may be considered as being magnetically shielded since mutual inductance to neighbouring circuits is very small due to the high reluctance of the long narrow path between the tapes. It does not provide electrostatic shielding unless the earth tape is wrapped around the live tape. However, in low impedance circuits, electrostatic pick-up is far less important than electromagnetic pick-up. The portions of the tape leads 7 and 9 which are wound around the element are as close as possible to the capacitor element and thus space for magnetic flux is avoided.

In one example, in which a capacitor of this construction was made using the element of a 1 µf., 250 v. Hunts metallised capacitor type W48, A309, the measured inductance was about $5 \times 10^{-10}$ H, i.e., a reduction by a factor of about 12 as compared with the conventional canned capacitor. A similar result was obtained using a 0.5 µf., 350 v. extended foil capacitor, Hunts type L57, A136.

Although, in the preferred form above referred to, the tape leads are wound in opposite directions around the capacitor element, an electrically similar result is achieved if they are wound in the same direction. Winding in opposite directions, however, provides a mechanically stronger capacitor.

Where the capacitor element is of the spiral foil paper or electrolytic type, the tape leads are connected directly to, or may be formed by extension of, the foils, rather than to metallised end plates on the element, since the normal connection in this type of capacitor is made to one point only on each foil. In this case, the foils of the element would require to be mechanically strong. This feature could, of course, be used in the case of other types of capacitors, e.g. metallised or extended foil capacitors, provided that the foils thereof were mechanically strong. However, it produces no advantage as the H.F. circuits are equivalent to the construction in which the tape leads are connected to metallised end plates.

The capacitor constructions according to this invention are suitable for cathode by-passing and similar uses, particularly when using disk seal valves or tubes. Conventional valves or tubes and transistors have too much lead inductance to take full advantage of low inductance by-passing.. With disk seal valves or tubes, however, connection to the electrodes can be made solely by tapes and a substantial increase in bandwidth of the by-passing may be obtained.

Further, tape transmission lines combined with low impedance capacitors according to the invention, may be used to distribute H.T. at very low impedance with the important advantage that a large reduction in unwanted interaction between different circuits supplied by a common H.T. line is obtained. For example, a high gain amplifier using such an arrangement will be unlikely to have unwanted output-input coupling via the supply impedance. Conventionally, the obviation of such unwanted output-input coupling is achieved by decoupling, i.e., using a filter between every circuit and the H.T. line. However, in some applications, such decoupling cannot be used and in those cases where such decoupling can be used and a large number of circuits are involved, a much larger number of components is required than is the case using low impedance capacitors according to this invention as above described.

We claim:

1. An electrical capacitor comprising a capacitor element and two flat metal foil tape leads for the capacitor, first portions of said leads extending radially outwardly from the element closely adjacent to, but electrically insulated from, one another in sandwich configuration so as to form a flat transmission line and second portions of said leads extending closely against the element and connecting the said first lead portions to the element.

2. An electrical capacitor comprising a capacitative element having metallic plate terminals at each end; and two flat metal foil tape leads wound around the element and having portions extending therefrom in superposed, but insulated, relation in sandwich configuration, means connecting one of said leads at one end of the element to one of said terminals, and means connecting the other of said leads at the other end of the element to the other of said terminals.

3. An electrical capacitor comprising a cylindrical capacitative element; a metallic terminal plate at each end of said element; a first metal foil tape lead wound closely around the said element for slighty less than one turn and having a flat end portion extending radially outwardly therefrom, such lead being at one end of the element conductively crimped over the terminal plate at such end; an insulating tape wound around the element closely over the said first lead in a direction opposite to the direction of winding of said first lead and having an end portion superposed on the said end portion of the first lead; and a second metal foil tape lead wound around the element closely over the said insulating tape in the same direction as the direction of winding of the latter, conductively crimped over the terminal plate at the other end and having a flat end portion superposed over the said end portion of the insulating tape, the flat end portions of the metal foil tape leads being in sandwich configuration and defining a flat transmission line.

References Cited by the Examiner

UNITED STATES PATENTS

| 2,073,880 | 3/37 | Robinson | 317—260 |
| 2,464,377 | 3/49 | Cohen et al. | 317—242 |
| 2,537,959 | 1/51 | Beverly | 333—31 |
| 2,930,714 | 3/60 | Netherwood | 317—260 |
| 2,958,720 | 11/60 | Simpson | 317—242 |
| 2,963,771 | 12/60 | Clemons | 317—260 |

FOREIGN PATENTS

| 680,432 | 10/52 | Great Britain. |

JOHN F. BURNS, *Primary Examiner.*